United States Patent [19]

Trabert et al.

[11] Patent Number: 4,614,763
[45] Date of Patent: Sep. 30, 1986

[54] MOULDING COMPOUNDS OF THERMOPLASTIC POLYAMIDE AND GRAFT RUBBER

[75] Inventors: Ludwig Trabert; Rudolf Binsack, both of Krefeld; Christian Lindner, Cologne; Josef Merten, Korschenbroich; Heinrich Haupt, Krefeld; Leo Morbitzer, Cologne; Gunter B. Weber; Claus Wulff, both of Krefeld, all of Fed. Rep. of Germany

[73] Assignee: Bayer Aktiengesellschaft, Leverkusen, Fed. Rep. of Germany

[21] Appl. No.: 697,768

[22] Filed: Feb. 4, 1985

[30] Foreign Application Priority Data

Feb. 16, 1984 [DE] Fed. Rep. of Germany ....... 3405532

[51] Int. Cl.$^4$ ............................................. C08L 51/00
[52] U.S. Cl. .................................................... 525/66
[58] Field of Search ......................................... 525/66

[56] References Cited

U.S. PATENT DOCUMENTS

| 4,338,406 | 7/1982 | Sanderson et al. | 525/66 |
| 4,381,371 | 4/1983 | Nielinger et al. | 525/66 |
| 4,405,748 | 9/1983 | Nielinger et al. | 525/66 |

FOREIGN PATENT DOCUMENTS 0014879 2/1980 European Pat. Off. .
3105364 2/1981 Fed. Rep. of Germany .

Primary Examiner—John C. Bleutge
Assistant Examiner—A. L. Carrillo
Attorney, Agent, or Firm—Connolly & Hutz

[57] ABSTRACT

Thermoplastic moulding materials, with improved toughness at low temperatures, of polyamide and crosslinked graft rubbers from the diene rubber and acrylate rubber series, obtained by heating blends of the two components below the melting point of the polyamide.

18 Claims, No Drawings

MOULDING COMPOUNDS OF THERMOPLASTIC POLYAMIDE AND GRAFT RUBBER

The invention relates to thermoplastic moulding materials, with improved toughness at low temperatures, of polyamide and cross-linked graft rubbers from the diene rubber and acrylate rubber series, obtained by heating blends of the two components below the melting point of the polyamide.

Moulded articles of polyamides are used because of their mechanical properties such as rigidity, abrasion resistance, hardness, dynamic and thermal stability and ease of manufacture but their inadequate toughness is a disadvantage.

There are a number of proposals for improving the toughness of polyamide moulding materials by admixing other polymers. Thus, polyolefins (DE-OS No. (German Published Specification) 1,694,802, DE-OS Nos. 2,038,317, DE-OS 3,022,295) and ethylene ionomers (EP-OS No. (European Published Specification) 34,704, EP-OS No. 69,200 and EP-OS No. 72,480) have been proposed. Grafted acrylate rubbers and diene rubbers which have a quite specific graft structure and are prepared by certain processes have moreover been proposed as modifications (EP-OS No. 3,126, DE-OS No. 2,758,615, DE-OS No. 3,101,771 and DE-OS No. 3,120,803).

In general these moulding compositions have an improved toughness. However, it has been found that such moulding compositions cannot be used completely satisfactorily for important applications, such as, for example, on bodywork, bumpers and spoilers, steering wheels and steering columns in the vehicle sector. Particular requirements are imposed on these components, especially at low temperatures.

Surprisingly, it has now been found that tougher products are obtained if mixtures of polyamide and a graft rubber prepared by usual processes are heated to temperatures below the melting point of the polyamide. Obviously a kind of "coupling" is thereby achieved, such that the insoluble residue obtainable by solution fractionation with the usual polyamide solvents (for example formic acid, trifluoroethanol or 1,1,1,3,3,3-hexafluoro-2-propanol) not only contains rubber but also has a polyamide content.

It is indeed known that the molecular weight and/or the viscosity of polyamides can be increased by heating to temperatures below the melting point of the polyamide under an inert gas and under reduced pressure. However, the mechanical properties of the polyamides, in particular the toughness, are not thereby noticeably changed. In addition, in the case of solid phase postcondensation in the presence of graft rubber, it had to be expected that the graft products, in particular those based on polybutadiene, become damaged by heat on prolonged residence times at high temperatures and thus become useless, and in some cases embrittlement takes place.

The invention relates to thermoplastic moulding compositions prepared from:

I 65-97, preferably 70-95 and particularly preferably 75-90% by weight, based on components I and II, of a polyamide and II 3-35, preferably 5-30 and particularly preferably 10-25% by weight, based on components I and II, of a graft rubber with a gel content of at least 50% by weight, preferably of at least 80% by weight and in particular of at least 90% by weight, which are characterised in that they have a degree of coupling of at least 3%, preferably of $\geq 8\%$, determined by solution fractionation in formic acid.

The moulding compositions according to the invention are preferably prepared by mixing the two polymer components with one another while melting, preferably in a twin-screw extruder, and processing the mixture to granules, and subsequently heating the granules, preferably with the maximum possible exclusion of oxygen and if appropriate in vacuo or under $N_2$, to temperatures of 5 to 80, preferably to 10-50 and in particular 15°-40, °C., below the melting point of the polyamide used for the preparation of the blend for at least half an hour, preferably at least 4 hours.

Suitable polyamides I are all the thermoplastic polyamides, preferably partly crystalline polyamides. Thus, polyamide 6, polyamide 66 or copolymers thereof can be used as partly crystalline polyamides for the moulding compositions according to the invention. Partly crystalline polyamides in which all or some of the acid component consists of terephthalic acid and/or isophthalic acid and/or suberic acid and/or sebacic acid and/or azelaic acid and/or adipic acid and/or cyclohexanedicarboxylic acid and in which all or some of the diamine component consists of m- and/or p-xylylenediamine and/or hexamethylenediamine and/or 2,2,4-trimethyl hexamethylendiamine and/or 2,4,4-trimethylhexamethylenediamine and/or isophorondiamine are also possible.

Polyamides which have been prepared partly from lactams with 6-12 C atoms and also using one or more of the above mentioned starting components are furthermore suitable.

Particularly preferred partly crystalline polyamides are Polyamide 6 and Polyamide 66.

The polyamides should preferably have a relative viscosity (measured on a 1 % strength by weight solution in m-cresol at 25° C.) of 2.0-5.0, particularly preferably of 2.5 to 4.0.

Preferred graft rubbers II have average particle diameters $d_{50}$ of 0.05 to 1, preferably 0.1 to 0.8 and in particular 0.2 to 0.8, μm.

The average particle diameter $d_{50}$ is the diameter above and below which in each case 50 % by weight of the particles lie. It can be determined by means of ultracentrifuge measurements (W. Scholtan, H. Lange, Kolloid. Z. and Z. Polymere 250 (1972), 782-796) or by means of electron microscopy and subsequent particle counting (G. Kampf, H. Schuster, Angew. makromolekulare Chemie, 14, (1970), 111-129), or by means of light scattering measurements.

Graft rubbers II are crosslinked and have a gel content of at least 50% by weight, preferably of at least 80% by weight and in particular of at least 90% by weight, based on II.

The gel contents of the crosslinked diene rubbers are determined at 25° C. in toluene, and the gel contents of the crosslinked acrylate rubbers are determined at 25° C. in dimethylformamide (M. Hoffmann, H. Krämer, R. Kuhn, Polymeranalytik I and II (Polymer analysis I and II), Georg Thieme Verlag, Stuttgart 1977).

Preferred graft rubbers II are graft polymers obtained by grafting polymerisation of 15-60, preferably of 20 to 50, and in particular 25 to 40% by weight of at least one vinyl or vinylidene monomer, preferably from the series comprising styrene, α-methylstyrene, acrylonitrile, $C_1-C_8$-alkylacrylate, $C_1-C_8$-alkylmethacrylate, hydroxy-$C_2$-$C_8$-alkyl(meth)acrylate and epoxy-$C_2$-$C_8$-alkyl(meth)acrylate onto 40 to 85, preferably 50 to 80, and in particular 60 to 75, % by weight, of a crosslinked diene rubber or acrylate rubber in particle form.

The grafted monomers can be grafted onto the graft rubber base individually or in mixtures. Preferred grafted monomers are methyl methacrylate and mixtures of styrene and methyl methacrylate in a ratio of 10:90 to 50:50 and mixtures of styrene and acrylonitrile in a ratio of 90:10 to 50:50.

Preferred diene rubbers are crosslinked homopolymers and/or copolymers of conjugated $C_4$-$C_6$-dienes. Buta-1,3-diene is the preferred diene. The diene copolymers can contain, in addition to the diene radicals, up to 30% by weight, based on the diene copolymer, of radicals of other ethylenically unsaturated monomers, such as, for example, styrene, acrylonitrile and esters of acrylic or methacrylic acid with monohydric $C_1$-$C_4$-alcohols, such as, for example, methyl methacrylate, ethyl acrylate, methyl acrylate and ethyl methacrylate.

The preparation of the diene rubber graft base and the graft polymers prepared therefrom is described, for example, in "Methoden der Organischen Chemie" ("Methods of organic chemistry") (Houbey-Weyl), Volume 14/1, Georg Thieme Verlag, Stuttgart 1961, pages 393-406, and in Ullmanns Encyclopädie der technischen Chemie (Ullmann's enclycopaedia of industrial chemistry), 4th Edition, Volume 19, Verlag Chemie, Weinheim, 1981, pages 279 to 284.

Graft products which are preferably used are those such as are described in DE-OS No. 2,742,176.

Preferred graft bases which are based on acrylate rubber are polymers obtained by polymerisation of $C_1$-$C_8$-alkyl acrylate. The polymers can also be copolymers of acrylates with up to 40% by weight, based on the copolymer, of other vinyl monomers, such as styrene, acrylonitrile, methyl methacrylate, vinyl esters or vinyl ethers.

The acrylate rubbers are crosslinked, esters of unsaturated $C_3$-$C_{12}$-monocarboxylic acids and unsaturated monohydric $C_2$-$C_{12}$-alcohols or saturated $C_2$-$C_{20}$-polyols with 2 to 4 OH groups, such as, for example, polyunsaturated heterocyclic compounds, such as trivinyl and triallyl cyanurate and isocyanurate; in particular triallyl cyanurate; polyfunctional vinyl compounds, such as di- and tri-vinylbenzenes; and also triallyl phosphate preferably being used as crosslinking monomers with more than one copolymerisable double bond.

Preferred crosslinking monomers are allyl methacrylate, ethylene glycol dimethacrylate, diallyl phthalate and heterocyclic compounds containing at least three copolymerisable ethylenically unsaturated double bonds.

Particularly preferred crosslinking monomers are the cyclic monomers triallyl cyanurate, triallyl isocyanurate, trivinyl cyanurate, trisacryloylhexahydro-s-triazine and triallyl benzenes.

The amount of crosslinking monomers is preferably 0.02 to 5, in particular 0.05 to 2, % by weight, based on the rubber graft base.

In the case of cyclic crosslinking monomers with at least three ethylenically unsaturated double bonds, it is advantageous to use not more than 1% by weight, based on the rubber graft base.

Acrylate rubbers can also be multi-shell products which contain a crosslinked diene rubber obtained from one or more conjugated dienes, such as polybutadiene, or a copolymer of a conjugated diene with an ethylenically unsaturated monomer, such as styrene and/or acrylonitrile, as the core, and an acrylate monomer polymerised on as the shell.

The amount of polydiene core in such multi-shell rubbers can be 0.1 to 80, preferably 10 to 50, % by weight. The shell(s) and core can be partly crosslinked or highly crosslinked, independently of one another.

Preferred grafted acrylate rubbers are those which (a) are crosslinked with cyclic trifunctional comonomers, such as triallyl cyanurate and triallyl isocyanurate (described in DE-OS No. 3,039,114); (b) contain a polybutadiene core (described in DE-OS No. 3,200,070; (c) have been prepared "in the absence of suspending agent" (described in DE-OS No. 3,117,052).

In the preparation of the graft rubbers II by grafting copolymerisation, which is usually carried out in the presence of free radical initiators, for example water-soluble initiators, emulsifiers or complexing agents/-grafting activators, and regulators, a certain amount of free polymers or copolymers of the grafted monomers forming the grafted shell is in general also formed, in addition to the actual graft copolymer.

A graft rubber II in the context of the invention is therefore the product obtained by polymerisation of grafted monomers in the presence of the rubber latex.

The moulding materials according to the invention have optimum properties if the amount of free (co)polymer in the graft product II does not exceed 15% by weight, preferably 10% by weight and in particular 7% by weight, based on II. The Staudinger index of these free (co)polymers should be less than 0.6 dl/g, preferably less than 0.4 dl/g, measured in dimethylformamide at 25° C.

Particularly preferred grafted rubbers are described, for example, in DE-OS Nos. 2,742,176, 2,941,025, 3,151,441 and 3,200,070 and in European Pat. No. 34,748.

The moulding materials according to the invention can contain the customary additives, such as lubricants, mould release agents, nucleating agents, stabilisers, fillers, reinforcing agents, flameproofing agents and dyestuffs.

The moulding materials can contain up to 60% by weight based on the reinforced moulding material, of fillers and/or reinforcing agents. Preferred reinforcing agents are glass fibres. Preferred fillers, which may also have a reinforcing action, are glass beads, mica, silicates, feldspar, quartz, talc, titanium dioxide and wollastonite.

All the known flameproofing agents, such as, for example, cyclic chlorine compounds, melamine and salts thereof, such as melamine cyanurate or melamine sulphate, and/or red phosphorus can be used for flameproofing.

The mixtures of polyamide I and graft rubber II can be prepared in the customary mixing units, such as mills, kneaders and single-screw and multi-screw extruders. The temperature during preparation of the mixtures should be at least 10° C. and advantageously at most 90° C. above the melting point of the polyamide.

The subsequent heat treatment can be carried out discontinuously or continuously under conditions under which oxidation is largely excluded, that is to say under an inert protective gas, such as nitrogen, carbon dioxide, argon or helium, or under reduced pressure. All apparatuses which allow such conditions are suitable. Heating can be carried out in a stationary bed or in an agitated bed, for example in a fluidised bed. The heating can also be carried out in vertical, horizontal or diagonally arranged tube reactors. The type of reactor is not critical. In principle, all reactors and all processes which are known for the polycondensation of polyamide in the solid phase below the melting point of the polyamide are suitable. In general, it is advantageous to carry out the heating such that the moulding materials are thereby agitated, since heat transfer is thereby facilitated and the possible occurrence of sticking is avoided. Thus, it can also be advantageous to carry out the heating at graduated temperatures.

In certain cases, it may be advantageous to carry out the heat treatment in the presence of small amounts of diamines, in which case it is advantageous to use the diamine of the polyamide component.

A degree of coupling of at least $\geq 3\%$, preferably $\geq 6\%$ and in particular $\geq 8\%$, is achieved in a simple manner in the process according to the invention.

Degree of coupling is understood as meaning the percentage weight ratio of thermoplastic polyamide I coupled to the graft product II, based on the total amount of graft product II:

Degree of coupling =

$$\frac{\text{Coupled thermoplastic polyamide I (in g)} \times 100}{\text{Total amount of graft product II (in g)}}$$

The degree of coupling is determined by treating the moulding materials according to the invention in formic acid to constant weight, that is to say until all the soluble thermoplastic polyamide has been dissolved by the formic acid. The coupled polyamide is determined in the insoluble residue which remains, for example by IR spectroscopy or nitrogen analysis in a known manner.

The moulding materials according to the invention are distinguished by an improved toughness. An outstanding feature is the improvement in toughness at low temperatures. Another feature is the high heat distortion point.

The moulded articles produced from the moulding materials according to the invention by injection moulding or extrusion are particularly suitable in cases where high impact stresses must be expected, for example for bumpers, spoilers, overriders, bodywork components, steering wheels and steering columns in the vehicle sector.

EXAMPLES

Components used:

A. Polyamide 6 with a relative viscosity (measured on a 1% strength by weight solution in m-cresol at 25° C.) of 3.0. (B) Graft product prepared from 80% by weight of graft base of crosslinked polybutadiene (gel content of 85% by weight, measured in toluene) and 20% by weight of grafted-on material consisting of methyl methacrylate; average particle diameter $d_{50}=0.4$ μm (graft product C from European Pat. No. A-58,331). (C) Graft product with a core/shell structure prepared from: 81% by weight of graft base with 0.23 parts by weight of triallyl cyanurate and 99.1 parts by weight of n-butyl acrylate, polymerised as a shell around 0.66 part by weight of polybutadiene core (gel content of the graft base of 89% by weight, measured in dimethylformamide at 25° C.), and 19% by weight of grafted-on shell of methyl methacrylate; average particle diameter $d_{50}=0.5$ μm (preparation in accordance with European Pat. No. A-34,748).

PREPARATION AND TESTING OF THE MOULDING MATERIALS

The components were melted and homogenised on a continuously operating twin-screw extruder. The cylinder temperatures were chosen such that material temperatures of 260°–280° C. were maintained. The melt strand was devolatilised before exit from the nozzle, cooled in water and granulated and the granules were dried (comparison Examples 1–4).

ASTM bars were injection-moulded from the moulding materials on a customary injection-moulding machine (material temperature 260° C., mould temperature 80° C.). The notched impact strength (by the Izod method) at the stated temperatures and the heat distortion point (Vicat softening temperature in accordance with DIN 53 460, method B) and the heat of fusion, in accordance with the DSC method with a heating-up rate of 20° C./minute, were tested.

The granules thus obtained were exposed to hot nitrogen at 200° C. (6 l of nitrogen/hour) for various times in a glass tube 20 mm in diameter. After cooling, ASTM bars were produced and tested (Examples 1a–4a according to the invention).

TABLE 1

| Example | Component (% by weight) A | B | C | Duration of heating (hours) | Notched impact strength (J/m) +20° C. | −10° C. | −20° C. | −30° C. | −40° C. | Degree of coupling |
|---|---|---|---|---|---|---|---|---|---|---|
| 1* | 70 | 30 | — | 0 | 1150 | 900 | 800 | 420 | 250 | 1.4 |
| 1a | 70 | 30 | — | 10 | 1250 | 1200 | 1100 | 1000 | 980 | 6.1 |
| 2* | 90 | 10 | — | 0 | 600 | 200 | 150 | 100 | 80 | 1.8 |
| 2a | 90 | 10 | — | 10 | 800 | 650 | 200 | 150 | 150 | 6.5 |
| 3* | 80 | 20 | — | 0 | 800 | — | 200 | — | 100 | 1.5 |
| 3a | 80 | 20 | — | 10 | 1000 | — | 600 | — | 250 | 7.0 |
| 4* | 80 | — | 20 | 0 | 200 | — | — | — | — | 0.5 |
| 4a | 80 | — | 20 | 10 | 1500 | 1000 | 600 | 500 | 200 | 3.0 |

*Comparative experiments

| Example | Vicat B (°C.) | Heat of fusion (J/g) |
|---|---|---|
| 1* | 140 | 45 |
| 1a | 155 | 52 |

We claim:

1. A post-treatment process for the preparation of thermoplastic molding compositions having a degree of coupling of at least 3% comprising, heating a granulated blend comprising from 65% to 97%, based on the weight of the blend, of a thermoplastic polyamide and from 3% to 35%, based on the weight of the blend, of a graft rubber selected from a diene graft rubber and an acrylate graft rubber, where the graft rubber has a gel content of at least 50%, based on the weight of the graft rubber, to a temperature of from 5° C. to 80° C. below the melting point of the thermoplastic polyamide for at least one-half hour in vacuo or under a nitrogen atmosphere.

2. A post-treatment process as claimed in claim 1, wherein the granulated blend comprises from 70% to 95%, by weight of the blend, of the thermoplastic polyamide and from 5% to 30%, by weight of the blend, of the graft rubber.

3. A post-treatment process as claimed in claim 1, wherein the granulated blend comprises from 75% to 90%, by weight of the blend, of the thermoplastic polyamide and from 10% to 25%, by weight of the blend, of the graft rubber.

4. A post-treatment process as claimed in claim 1, wherein the graft rubber is obtained by the graft polymerization of 15% to 60%, by weight of the graft rubber, of a grafted monomer selected from vinyl or vinylidene monomers or combinations thereof, onto 40% to 85%, by weight of the graft rubber, of a particulate crosslinked diene rubber or acrylate rubber.

5. A post-treatment process as claimed in claim 4, wherein the graft rubber is obtained by the graft polymerization of 20% to 50%, by weight of the graft rubber, of the grafted monomer onto 50% to 80%, by weight of the graft rubber, of the particulate crosslinked diene rubber or acrylate rubber.

6. A post-treatment process as claimed in claim 4, wherein the graft rubber is obtained by the graft polymerization of 25% to 40%, by weight of the graft rubber, of the grafted monomer onto 60% to 75%, by weight of the graft rubber, of the particulate crosslinked diene rubber or acrylate rubber.

7. A post-treatment process as claimed in claim 5, wherein the grafted monomer is selected from methyl methacrylate, mixtures of styrene and methyl methacrylate having a styrene to methyl methacrylate weight ratio of 10:90 to 50:50, or mixtures of styrene and acrylonitrile having a styrene to acrylonitrile weight ratio of 90:10 to 50:50, and the particulate, crosslinked diene rubber is selected from homo or copolymers of conjugated dienes or mixtures thereof, wherein the conjugated dienes contain four to six carbon atoms.

8. A post-treatment process as claimed in claim 6, wherein the grafted monomer is selected from methyl methacrylate, mixtures of styrene and methyl methacrylate having a styrene to methyl methacrylate weight ratio of 10:90 to 50:50, or mixtures of styrene and acrylonitrile having a sytrene to acrylonitrile weight ratio of 90:10 to 50:50, and the particulate, crosslinked diene rubber is selected from homo or copolymers of conjugated dienes or mixtures thereof, wherein the conjugated dienes contain four to six carbon atoms.

9. A post-treatment process as claimed in claim 1, wherein the thermoplastic polyamide is polyamide 6 or polyamide 66.

10. A thermoplastic molding composition having a degree of coupling of at least 3%, prepared by the process of claim 1.

11. A thermoplastic molding composition having a degree of coupling of at least 3%, prepared by the process of claim 2.

12. A thermoplastic molding composition having a degree of coupling of at least 3%, prepared by the process of claim 3.

13. A thermoplastic molding composition having a degree of coupling of at least 3%, prepared by the process of claim 4.

14. A thermoplastic molding composition having a degree of coupling of at least 3%, prepared by the process of claim 5.

15. A thermoplastic molding composition having a degree of coupling of at least 3%, prepared by the process of claim 6.

16. A thermoplastic molding composition having a degree of coupling of at least 3%, prepared by the process of claim 7.

17. A thermoplastic molding composition having a degree of coupling of at least 3%, prepared by the process of claim 8.

18. A thermoplastic molding composition having a degree of coupling of at least 3%, prepared by the process of claim 9.

* * * * *